E. KEMPE.
Sewing-Machine Fan-Attachments.
No. 139,584. Patented June 3, 1873.
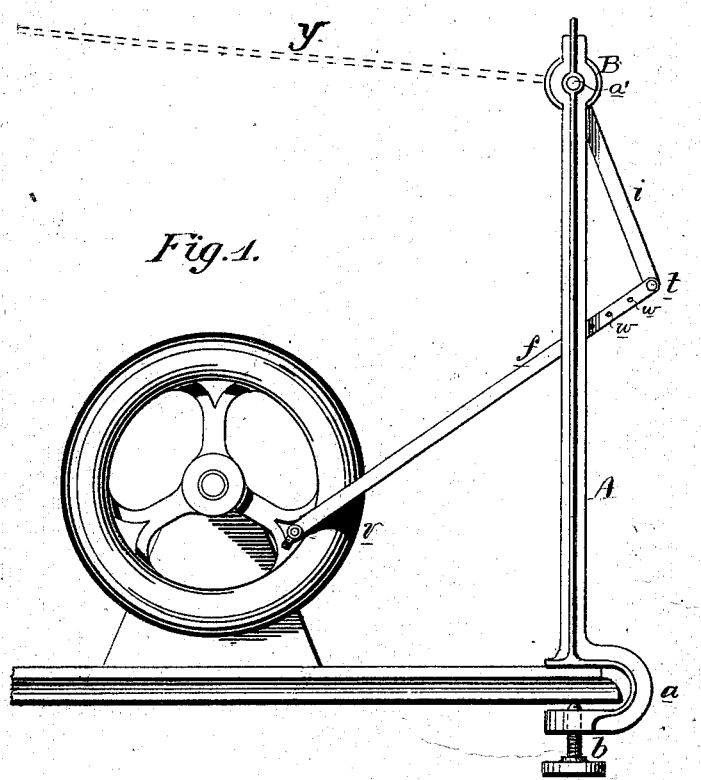
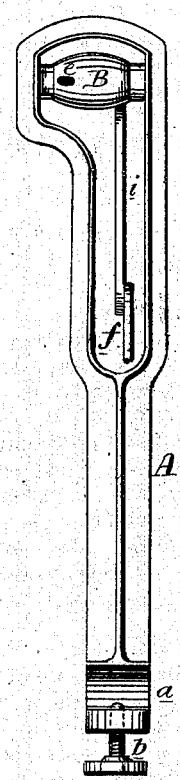
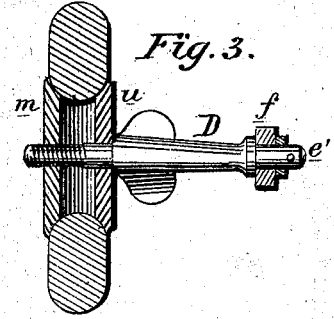
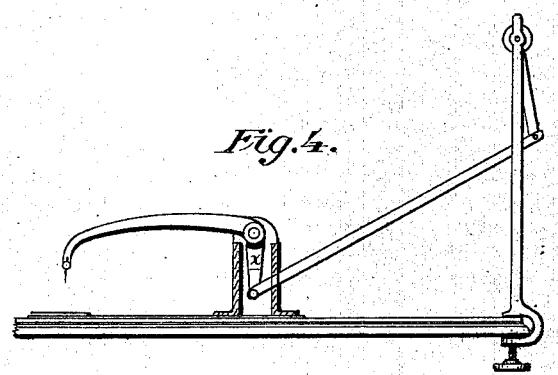
Attest:
Wm. E. Chaffee
Harry Coleman
Inventor:
E. Kempe
By his attys.
Howson and Son

UNITED STATES PATENT OFFICE.

EDWARD KEMPE, OF RICHMOND, VIRGINIA, ASSIGNOR TO HIMSELF AND NORTON C. NEWTON, OF SAME PLACE.

IMPROVEMENT IN SEWING-MACHINE FAN ATTACHMENTS.

Specification forming part of Letters Patent No. 139,584, dated June 3, 1873; application filed April 18, 1873.

*To all whom it may concern:*

Be it known that I, EDWARD KEMPE, of Richmond, county of Henrico, State of Virginia, have invented an Improved Fan-Attachment for Sewing-Machines, of which the following is a specification:

My invention consists of a fan attachment for sewing-machines, which is very simple and cheap, compact and portable, and constructed as described hereafter, so that it may be readily applied to almost any of the well-known machines.

A is a standard, at the bottom of which is a yoke, $a$, for receiving the back edge of the top of a sewing-machine stand, to which the standard may be secured by a set-screw, $b$. Across a recess in the upper portion of the standard extends a rod, C, on which vibrates loosely a hub or rock-shaft, B, there being a socket, $e$, in the hub for the reception of the handle of a fan, Y. From the hub extends downward an arm, $i$, and to the latter is jointed a connecting-arm, $f$, the opposite end of which is attached to any suitable portion of the machine, from which motion will be communicated to the fan, as will readily be understood.

In machines of the Singer class the arm $f$ may be connected to the wheel $v$, as shown in Fig. 1; but with a Wheeler & Wilson or Sloat machine the connection should be made to the arm $x$.

I prefer to employ for making the connection the device shown in Fig. 3, in which D is a thumb-screw having a nut, $m$, a washer, $u$, and a projecting stem, $e'$, to which the end of the arm $f$ is attached so that the screw can turn freely independently of the arm. To connect this device to the wheel or other part of the machine the threaded end of the screw is passed through any contracted recess or opening in the wheel until the washer $u$ finds a proper bearing, when the nut $m$ is applied and the screw turned until the wheel is securely clamped between the nut and washer.

With a Wheeler & Wilson machine the clamp is applied to the arm $x$ instead of to a wheel.

The arm $f$ has a series of openings, $w$, through any one of which the connecting-screw $t$ may be passed in order to secure the proper adjustment of the fan.

I claim—

The combination of the detachable standard A and rock-shaft B with the operating wheel or arm of a sewing-machine, by means of the rods $f$ and $i$, or other suitable connecting devices, substantially as specified.

In testimony whereof I have signed my name to this specification in the presence of two subscribing witnesses.

EDWARD KEMPE.

Witnesses:
 CHARLES E. FOSTER,
 W. V. M. ROHRER.